No. 614,418. Patented Nov. 15, 1898.
F. R. BLOUNT.
HYDROCARBON BURNING APPARATUS OR LAMP.
(Application filed Nov. 12, 1897. Renewed Oct. 18, 1898.)
(No Model.)
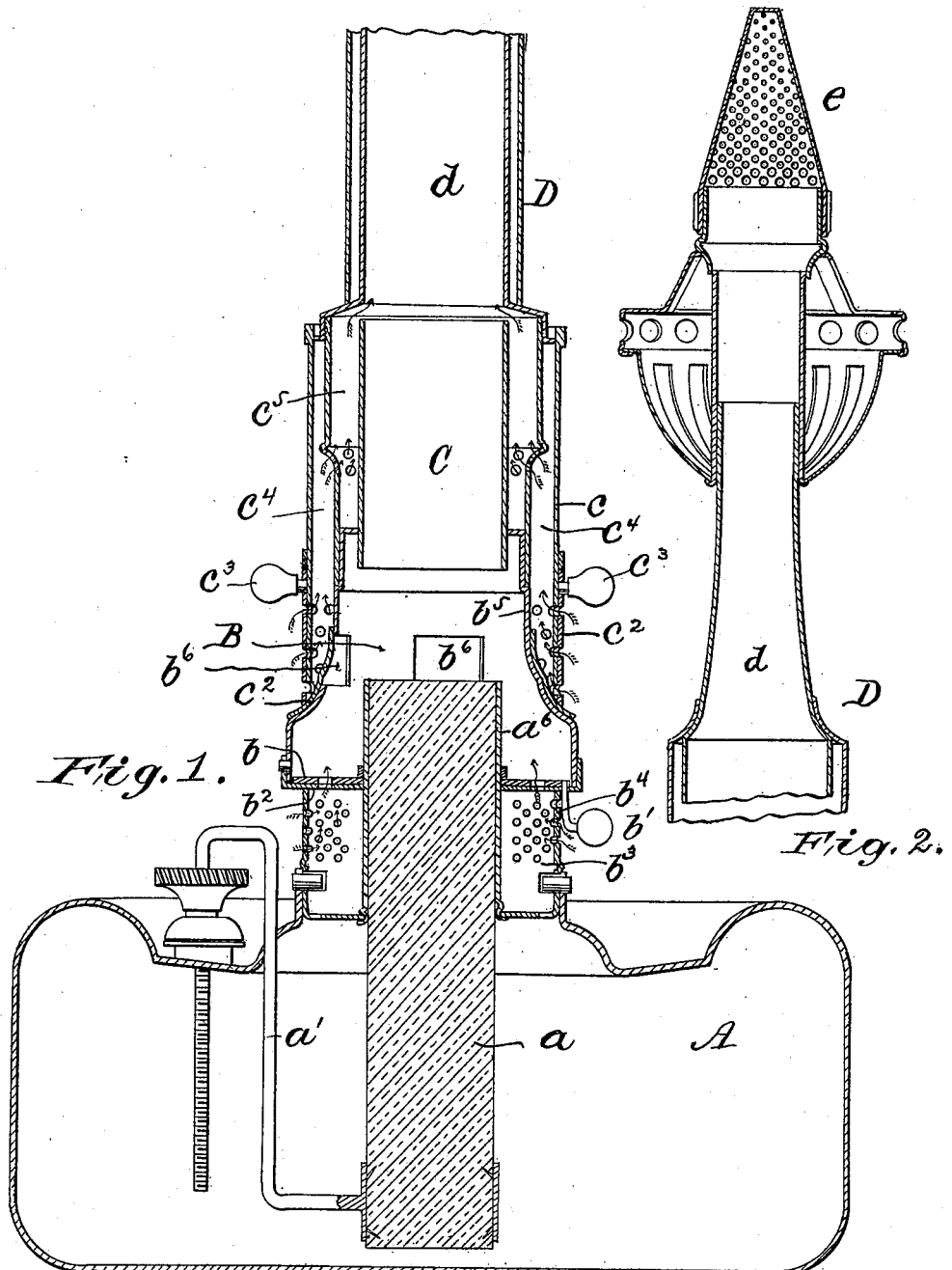

UNITED STATES PATENT OFFICE.

FREDERICK R. BLOUNT, OF NEW YORK, N. Y.

HYDROCARBON-BURNING APPARATUS OR LAMP.

SPECIFICATION forming part of Letters Patent No. 614,418, dated November 15, 1898.

Application filed November 12, 1897. Renewed October 18, 1898. Serial No. 693,920. (No model.)

*To all whom it may concern:*

Be it known that I, FREDERICK R. BLOUNT, a citizen of the United States, residing at New York, in the county of New York and State of New York, have invented certain new and useful Improvements in Hydrocarbon-Burning Apparatus or Lamps, of which the following is a specification, reference being had therein to the accompanying drawings.

My invention relates to that class of hydrocarbon lamps or heaters by means of which a smokeless flame is produced from a liquid or molten hydrocarbon through the instrumentality of a primary burner or generator, which vaporizes the hydrocarbon, and a secondary burner removed from the primary burner, the vapor generated at the primary burner being mixed with air and conveyed to the secondary burner, where it is converted into a smokeless "blue" flame of high temperature.

The lamp embodying my present invention is or may be in its general construction substantially the same as the lamp shown by my application, Serial No. 658,317, filed simultaneously herewith; but instead of having an annular wick, as does the lamp shown by my said application, my present lamp is provided with a single solid wick which extends into the combustion-chamber of the lamp and the top of which, in connection with its inclosing tube, constitutes the primary or vapor-generating burner of the lamp.

In the accompanying drawings, Figure 1 is a sectional view of a lamp embodying my invention, with the upper or secondary burner and the upper part of the tube forming the mixing-chamber broken away; and Fig. 2 is a vertical section of the upper part of the tube forming the mixing-chamber and of the upper or secondary burner.

A denotes the oil-reservoir of the lamp, the top of which supports a tube $a^6$, which incloses the solid wick $a$ of the primary burner. The said wick $a$ is preferably provided with a screw-actuated raising and lowering device or wire $a'$, operated by a thumb screw or nut in a well-known manner.

The primary burner-tube $a^6$ is supported in any suitable manner from the top of the oil-reservoir A, and extends up into the combustion-chamber B. Surrounding the wall of the combustion-chamber is a hood or sleeve $c$, having a foot-plate $c'$ resting on the wall of the combustion-chamber, and which sleeve may be lifted when the lamp is to be lighted through the openings $b^6$ in the wall $b^5$ of the combustion-chamber, and which hood or sleeve when in position, as shown, closes said openings. The lower part of the sleeve $c$ is perforated for the admission of air adjacent to the wall of the combustion-chamber, and surrounding said hood or sleeve is a second sleeve or ring $c^2$, which is provided with perforations, which may be brought into register with the perforations of the sleeve $e$ and which sleeve or ring $c^2$ may be turned by its handles $c^3$ to close the holes or perforations in the sleeve $c$ more or less to regulate the indraft of air to the mixing-chamber $d$. The air introduced in close proximity to the wall of the combustion-chamber becomes more or less heated on its way to the outer air-chamber $c^4$ and the inner air-chamber $c^5$, the latter opening into the mixing-chamber $d$.

Above the combustion-chamber B is a flue C, which connects the said combustion-chamber with the mixing-chamber $d$ and which is mainly surrounded by the inner air-chamber $c^5$. Below the combustion-chamber B is an air-chamber $b^3$, having a perforated or foraminous outer wall $b^4$, the top of said chamber $b^3$ being formed by a diaphragm $b^2$, provided with openings for the upward passage of air from the said air-chamber. Surmounting the said diaphragm $b^2$ is an annular regulating and extinguishing shutter $b$, provided with openings, which may be brought into register with the openings in the said diaphragm and which is adapted to be turned by means of a handle $b'$ to close the said openings more or less. When the lamp is first lighted, air will be freely admitted through the openings in the said shutter and diaphragm, and the said shutter will then be moved to close the said openings more or less, as may be required.

The tube D, within which is the mixing-chamber $d$, is preferably provided with a tapered or contracted upper part, which is surmounted by the secondary burner $e$, which, in the form of my invention herein shown, consists of a sharply-tapered foraminous truncated cone, this form of burner being found desirable for the single solid-wick lamp herein shown.

In the use of my improved lamp when the primary burner is lighted and the shutter $b$ is turned to properly smother the flame thereof a dense gas or vapor, heavily laden with carbon, is generated at the said primary burner and passes upward from the combustion-chamber B and through the flue C, above said chamber, to the mixing-chamber $d$, where it is mingled with air entering from the air-chamber $c^5$, and the gas or vapor thus mixed with air then passes upward to the secondary burner $e$, where, being lighted, it is converted into a smokeless blue flame of high temperature, which may be utilized for any desired purpose, but which, in the form of my invention herein shown, is intended to be used for heating an incandescing mantle for illuminating purposes.

I do not claim herein certain features of my improved lamp herein shown and also shown in my application, Serial No. 658,317, and which are therein claimed; but

What I claim, and desire to secure by Letters Patent, is—

1. In a heating or lighting apparatus, the combination with a primary or vapor-producing burner or generator comprising a single solid wick, of a combustion-chamber surrounding said burner, a mixing-chamber above the said combustion-chamber and in which mixing-chamber the vapor generated at said primary burner is mingled with air, means for regulating the inflow of air to said mixing-chamber, a flue connecting said combustion-chamber with said mixing-chamber, an air-chamber surrounding said flue and opening at its top into said mixing-chamber, and a secondary burner above said mixing-chamber.

2. In a heating or lighting apparatus, the combination with a primary or vapor-producing burner or generator comprising a single solid wick, of a combustion-chamber surrounding said burner, a mixing-chamber above the said combustion-chamber, and in which mixing-chamber the vapor generated at said primary burner is mingled with air, means for regulating the inflow of air to said mixing-chamber, a flue connecting said combustion-chamber with said mixing-chamber, an air-chamber surrounding said flue and opening at its top into said mixing-chamber, and a secondary burner above said mixing-chamber, said secondary burner consisting of a sharply-tapered, truncated, foraminous cone.

In testimony whereof I affix my signature in presence of two witnesses.

FREDERICK R. BLOUNT.

Witnesses:
HENRY CALVER,
M. L. SLATER.